(12) United States Patent
Hu et al.

(10) Patent No.: US 9,014,467 B2
(45) Date of Patent: Apr. 21, 2015

(54) IMAGE PROCESSING METHOD AND IMAGE PROCESSING DEVICE

(75) Inventors: Shi-Min Hu, Beijing (CN); Ming-Ming Cheng, Beijing (CN); Guo-Xin Zhang, Beijing (CN); Niloy J. Mitra, London (GB); Xiang Ruan, Otsu (JP)

(73) Assignees: OMRON Corporation, Kyoto-shi, Kyoto (JP); Tsinghua University, Beijing (CN)

( * ) Notice: Subject to any disclaimer, the term of this patent is extended or adjusted under 35 U.S.C. 154(b) by 190 days.

(21) Appl. No.: 13/469,578

(22) Filed: May 11, 2012

(65) Prior Publication Data
US 2012/0288189 A1  Nov. 15, 2012

(30) Foreign Application Priority Data
May 13, 2011  (CN) .......................... 2011 1 0124317

(51) Int. Cl.
| | | |
|---|---|---|
| *G06K 9/34* | (2006.01) | |
| *G06T 7/00* | (2006.01) | |
| *G06T 7/40* | (2006.01) | |
| *G06K 9/46* | (2006.01) | |

(52) U.S. Cl.
CPC .............. *G06T 7/0081* (2013.01); *G06T 7/408* (2013.01); *G06K 9/4671* (2013.01); *G06T 2207/10024* (2013.01); *G06T 2207/20164* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,282,317 B1* | 8/2001 | Luo et al. ...................... | 382/203 |
| 2002/0191861 A1* | 12/2002 | Cheatle ......................... | 382/282 |
| 2004/0091146 A1* | 5/2004 | Kim et al. ..................... | 382/162 |
| 2004/0120574 A1 | 6/2004 | Rosenholtz | |
| 2005/0008263 A1* | 1/2005 | Nagahashi et al. ........... | 382/305 |
| 2005/0163344 A1* | 7/2005 | Kayahara et al. ............. | 382/103 |
| 2006/0093184 A1 | 5/2006 | Fukui et al. | |
| 2006/0257048 A1* | 11/2006 | Lin et al. ....................... | 382/276 |
| 2007/0116361 A1 | 5/2007 | Le Meur et al. | |

(Continued)

FOREIGN PATENT DOCUMENTS

| | | |
|---|---|---|
| CN | 101329767 A | 12/2008 |
| CN | 101520894 A | 9/2009 |

(Continued)

OTHER PUBLICATIONS

"Global Contrast Based Salient Region detection" Computer Vision and Pattern Recognition (CVPR), 2011 IEEE Conference on, pp. 409-416 2011.*

(Continued)

*Primary Examiner* — Sean Motsinger
(74) *Attorney, Agent, or Firm* — Osha Liang LLP

(57) ABSTRACT

An image processing method includes a segmentation step that segments an input image into a plurality of regions by using an automatic segmentation algorithm, and a computation step that calculates a saliency value of one region of the plurality of segmented regions by using a weighted sum of color differences between the one region and all other regions. Accordingly, it is possible to automatically analyze visual saliency regions in an image, and a result of analysis can be used in application areas including significant object segmentation, object recognition, adaptive image compression, content-aware image resizing, and image retrieval.

16 Claims, 5 Drawing Sheets
(1 of 5 Drawing Sheet(s) Filed in Color)

(56) References Cited

U.S. PATENT DOCUMENTS

| | | | | |
|---|---|---|---|---|
| 2008/0025648 | A1* | 1/2008 | Maeda et al. | 382/305 |
| 2008/0304740 | A1* | 12/2008 | Sun et al. | 382/168 |
| 2011/0222775 | A1* | 9/2011 | Aizawa et al. | 382/190 |
| 2012/0288189 | A1* | 11/2012 | Hu et al. | 382/164 |
| 2013/0223740 | A1* | 8/2013 | Wang et al. | 382/171 |

FOREIGN PATENT DOCUMENTS

| | | |
|---|---|---|
| CN | 101526955 A | 9/2009 |
| CN | 101650824 A | 2/2010 |
| JP | 2006-133990 A | 5/2006 |
| JP | 2010-025473 A | 2/2010 |
| JP | 4598778 B2 | 12/2010 |

OTHER PUBLICATIONS

Wittawin et al "Extracting Salient Visual Attention Regions by Color Contrast and Wavelet Transformation" ISCIT 2009.*

Office Action issued in corresponding Japanese Application No. 2012-108031 dated May 21, 2013, and English translation thereof (6 pages).

Felzenszwalb et. al., "Efficient Graph-Based Image Segmentation," International Journal of Computer Vision, vol. 59, No. 2, 2004, pp. 167-181 (15 pages).

Liu et. al., "Learning to Detect a Salient Object," IEEE Transactions on Pattern Analysis and Machine Intelligence, vol. 33, No. 2, Feb. 2011, pp. 353-367 (15 pages).

Espacenet—Bibliographic Data for CN 101520894 (1 page).
Espacenet—Bibliographic Data for CN 101526955 (1 page).
Espacenet- Bibliographic Data for Cn 101650824 (1 page).
Espacenet—Bibliographic Data for CN 101329767 (1 page).

Itti et. al., "A Model of Saliency-Based Visual Attention for Rapid Scene Analysis," IEEE Transactions on Pattern Analysis and Machine Intelligence, vol. 20, No. 11, Nov. 1998, pp. 1254-1259 (6 pages).

Ma et. al., "Contrast-based Image Attention Analysis by Using Fuzzy Growing," MM'03, Nov. 2-8, 2003, Berkeley, CA, USA, pp. 374-381 (8 pages).

Liu et. al., "Learning to Detect a Salient Object," IEEE Transactions on Pattern Analysis and Machine Intelligence, vol. X, No. XX, Dec. 2009, pp. 1-15 (15 pages).

Goferman et. al., "Context-Aware Saliency Detection," CVPR, 2010, pp. 1-8 (8 pages).

Zhai et. al., "Visual Attention Detection in Video Sequences Using Spatiotemporal Cues," ACM, 2009, pp. 815-824 (9 pages).

Achanta et. al., "Frequency-tuned Salient Region Detection," CVPR, 2009, pp. 1597-1604 (8 pages).

Extended European Search Report in corresponding Application No. 12167366.9, dated Oct. 16, 2014 (6 pages).

* cited by examiner

IMAGE PROCESSING METHOD AND IMAGE PROCESSING DEVICE

This Nonprovisional application claims priority under 35 U.S.C. §119(a) on Chinese Patent Application No. 201110124317.2 filed in China on May 13, 2011, the entire contents of which are hereby incorporated by reference.

TECHNICAL FIELD

The present invention belongs to the field of image processing technology, and relates to an image processing method and image processing device for detecting visual saliency of an image. More particularly, the present invention relates to an image processing method and image processing device for detecting visual saliency of an image based on regional contrast.

BACKGROUND ART

Visual attention is a significant mechanism for facilitating human visual system (HVS) to accurately and efficiently identify a scene. Capturing a salient region within an image by a computation method is an important research subject in the field of computer vision. It can help an image processing system to appropriately allocate computational resources in the subsequent processing steps. Saliency maps have been widely used in various computer vision applications such as object-of-interest image segmentation (see Chinese Patent Application Nos. 200910046276, 200910081069), object recognition, adaptive image compression, content-aware image resizing (see Chinese Patent Application No. 200910092756), and image retrieval (see Chinese Patent Application No. 200910081069).

Image visual saliency detection is one of the subjects that have attracted much attention of researchers. In theoretical researches on visual attention, the visual attention is classified into two types: fast, task independent (pre-attentive), data driven saliency detection; and slower, task dependent, goal driven saliency detection. The method according to one or more embodiments of the present invention relates to the former type. As is clear from the physiological researches, a human's visual cells respond preferentially to high-contrast stimulus in their receptive fields. In most of the existing researches on data driven visual saliency detection, visual saliency is calculated by computing contrast between image contents and scenes in various forms. For ease of explanation, the researches on visual saliency detection are further classified into two sub-types: a local contrast based method; and a global contrast based method.

The local contrast based method computes the saliency by the rarity of image regions with respect to relatively small local neighborhoods. Itti et al. proposed "A model of saliency-based visual attention for rapid scene analysis" (IEEE TPAMI, 20(11): 1254-1259, 1998) in 1998. This method introduces that the image saliency could be defined using central-surrounded differences across multi-scale image features. Further, Ma and Zhang proposed "Contrast-based image attention analysis by using fuzzy growing" (In ACM Multimedia, pages 374-381, 2003) in 2003. This method uses a local contrast analysis to generate saliency maps. Liu et al. proposed "Learning to detect a salient object" (IEEE TPAMI, 33(2): 353-367, 2011) in 2007. This method finds an optimal combination of weighted values for saliency detection methods of, for example, color space distribution, multi-scale contrast and central-surrounded histogram differences by learning manner. Goferman et al. modeled low-level clues, global considerations, organization rules, and high-level features in their work "Context-aware saliency detection" (In CVPR, 2010) in 2010. Results of these local contrast based methods generally produce higher saliency values near edges of objects instead of uniformly highlighting entire visual-salient objects.

On the contrary, the global contrast based method evaluates the saliency of an image region by measuring the difference between this image region and the entire image. Zhai and Shah proposed "Visual attention detection in video sequences using spatiotemporal cues" (In ACM Multimedia, pages 815-824, 2006) in 2006. This method calculates a saliency value of a pixel using luminance difference between the pixel and all the other pixels. However, in consideration of efficiency, this method used only luminance information of an image, thus ignoring distinctiveness clues in other color channels. Achanta et al. proposed "Frequency-tuned salient region detection" (In CVPR, pages 1597-1604, 2009) in 2009. This method obtains the saliency of each pixel using the pixel's color difference from the average image color. The simple approach, however, is insufficient to effectively analyze complex and varied natural images.

There is an existing Chinese Patent Application in this art, namely "A learning-based automatic detection method for a sequence of salient objects in videos" (Chinese Patent Application No. 200810150324). This method generally takes several seconds to process an image, so that it is hard to satisfy the needs for many real-time processing applications.

SUMMARY OF INVENTION

One or more embodiments of the present invention rapidly and efficiently analyze saliency values of pixels in an image so as to uniformly highlight salient object regions in the image.

Therefore, one or more embodiments of the present invention provide an image processing method and image processing device for detecting (computing) visual saliency of an image based on regional contrast. The obtained saliency map could be used in a series of computer vision applications.

An image processing method according to one or more embodiments of the present invention is an image processing method for detecting (computing) visual saliency of an image based on regional contrast, the method including:

a segmentation step that segments an input image into a plurality of regions by using an automatic segmentation algorithm; and a computation step that calculates a saliency value of one region of the plurality of segmented regions by using a weighted sum of color differences between the one region and all other regions.

In the image processing method according to one or more embodiments of the present invention, in the computation step, a saliency $S(r_k)$ of a region $r_k$ of the plurality of segmented regions is defined by the following expression:

$$S(r_k) = \sum_{r_k \neq r_i} \exp\left(-\frac{D_s(r_k, r_i)}{\sigma_s^2}\right) w(r_i) D_c(r_k, r_i)$$

wherein $D_s(r_k, r_i)$ and $D_c(r_k, r_i)$ are respectively a spatial distance and a color difference between the region $r_k$ and a region $r_i$, i and k are natural numbers, $w(r_i)$ is a weighted value of the region $r_i$, and $\sigma_s^2$ is a parameter for controlling the effect of a distance factor.

In the image processing method according to one or more embodiments of the present invention, the parameter $\sigma_s^2$ is a value in a range from 0.1 to 1.0 when spatial coordinates of a pixel in the image are normalized (linearly-resized) to values in a range from 0 to 1.

In the image processing method according to one or more embodiments of the present invention, the number of pixels included in the region $r_i$ is deemed as the weighted value $w(r_i)$ of the region $r_i$.

In the image processing method according to one or more embodiments of the present invention, the color difference $D_c(r_k,r_i)$ between the region $r_k$ and the region $r_i$ is defined by the following expression:

$$D_c(r_k,r_i)=\Sigma_{i=1}^{n1}\Sigma_{j=1}^{n2}f(c_1,i)f(c_2,j)D(c_{1,i},c_{2,j})$$

wherein $f(c_k,i)$ is an appearance frequency of i-th $c_k$ of $n_k$ types of colors contained in the region $r_k$, $D(c_{1,i},c_{2,j})$ is an Euclidean distance between two colors $c_{1,i}$ and $c_{2,j}$ in a color space, and $k=\{1,2\}$.

In the image processing method according to one or more embodiments of the present invention, the computation is performed with 8 to 128 classes of colors in each color channel.

In the image processing method according to one or more embodiments of the present invention, the method further includes at least one of:

an output step that outputs the calculated saliency value;
a display step that displays the calculated saliency value; and
a storage step that stores the calculated saliency value.

According to one or more embodiments of the present invention, an image processing device for detecting visual saliency of an image based on regional contrast, includes:

a segmentation unit that segments an input image into a plurality of regions by using an automatic segmentation algorithm; and a computation unit that calculates a saliency value of one region of the plurality of segmented regions by using a weighted sum of color differences between the one region and all other regions.

In the image processing device according to one or more embodiments of the present invention, a saliency $S(r_k)$ of a region $r_k$ of the plurality of segmented regions is defined by the following expression:

$$S(r_k) = \sum_{r_k \neq r_i} \exp\left(-\frac{D_s(r_k, r_i)}{\sigma_s^2}\right) w(r_i) D_c(r_k, r_i)$$

wherein $D_s(r_k,r_i)$ and $D_c(r_k,r_i)$ are respectively a spatial distance and a color difference between the region $r_k$ and a region $r_i$, i and k are natural numbers, $w(r_i)$ is a weighted value of the region $r_i$, and $\sigma_s^2$ is a parameter for controlling the effect of a distance factor.

In the image processing device according to one or more embodiments of the present invention, the parameter $\sigma_s^3$ is a value in a range from 0.1 to 1.0 when spatial coordinates of a pixel in the image are normalized to values in a range from 0 to 1.

In the image processing device according to one or more embodiments of the present invention, the number of pixels included in the region $r_i$ is deemed as the weighted value $w(r_i)$ of the region $r_i$.

In the image processing device according to one or more embodiments of the present invention, the color difference $D_c(r_k,r_i)$ between the region $r_k$ and the region $r_i$ is defined by the following expression:

$$D_c(r_k,r_i)=\Sigma_{i=1}^{n1}\Sigma_{j=1}^{n2}f(c_1,i)f(c_2,j)D(c_{1,i},c_{2,j})$$

wherein $f(c_k,i)$ is an appearance frequency of i-th $c_k$ of $n_k$ types of colors contained in region $r_k$, $D(c_{1,i},c_{2,j})$ is an Euclidean distance between two colors $c_{1,i}$ and $c_{2,j}$ in a color space, and $k=\{1,2\}$.

In the image processing device according to one or more embodiments of the present invention, the computation is performed with 8 to 128 classes of colors in each color channel.

In the image processing device according to one or more embodiments of the present invention, the device further includes at least one of:

an output unit that outputs the calculated saliency value;
a display unit that displays the calculated saliency value; and
a storage unit that stores the calculated saliency value.

According to one or more embodiments of the present invention, the image processing method and image processing device for detecting (computing) visual saliency of an image based on regional contrast calculate a saliency value of each one of the regions segmented by automatic segmentation algorithm by using a weighted sum of color differences between the one region and the other regions. This makes it possible to rapidly and efficiently analyze saliency values of pixels in the image, so that salient object regions in the image can be uniformly highlighted. As a result of testing with the internationally large-scale image visual saliency measurement dataset, the image processing method according to one or more embodiments of the present invention is apparently more excellent than the conventional methods. In the image processing method according to one or more embodiments of the present invention, it is possible to efficiently analyze complex and varied natural images and to satisfy the needs for many real-time processing applications. According to one or more embodiments of the present invention, it is possible to automatically analyze visual saliency regions in an image, and a result of analysis can be used in application areas including significant object segmentation, object recognition, adaptive image compression, content-aware image resizing, and image retrieval.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF INVENTION

Hereinafter, embodiments of the present invention will be described in more detail with reference to attached drawings.

The following embodiments are presented only for the purpose of describing the present invention, and are not intended to limit the scope of the present invention.

Embodiments of the present invention disclose an image processing method and image processing device for computing a visual saliency value of an image region by calculating a weighted sum of color differences between the image region and other image regions. With saliency values detected by the method and the device, it is possible to provide support for a series of image processing applications including: significant object segmentation, content-aware image resizing, and image retrieval.

Figure 1:
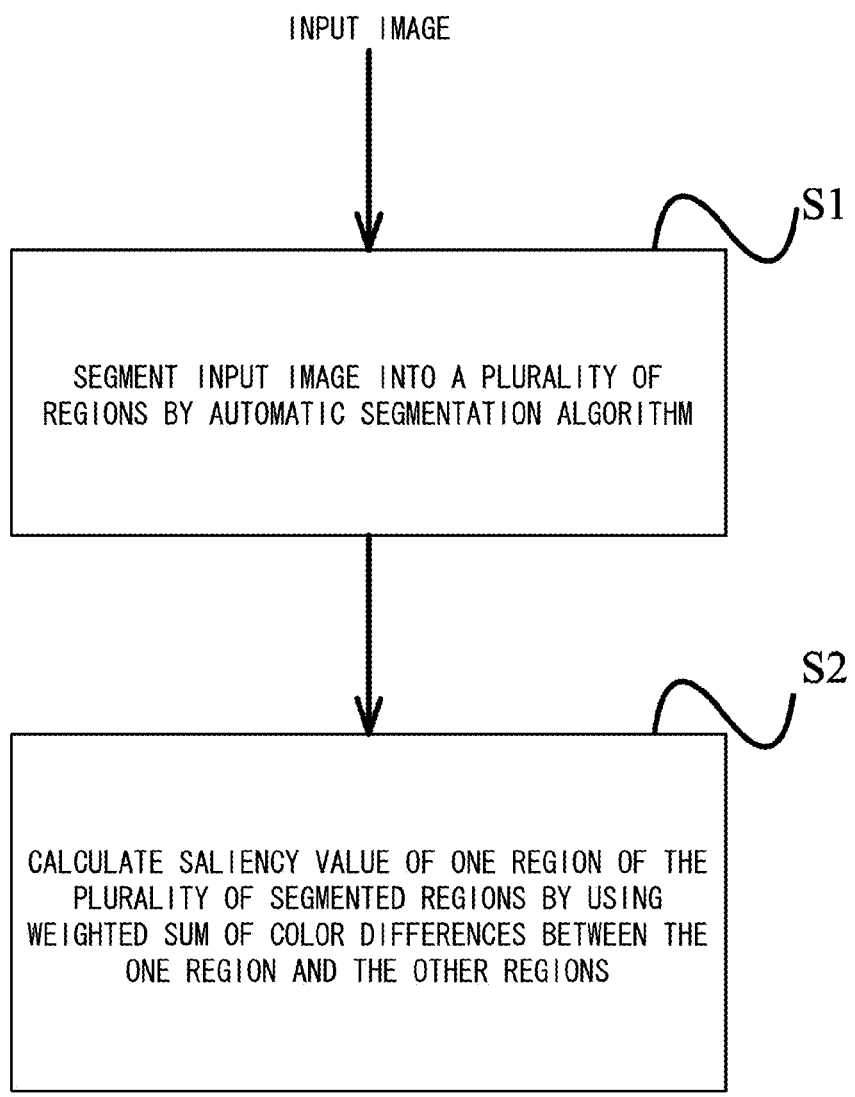
FIG. 1 is a flowchart illustrating an image processing method according to one embodiment of the present invention.

FIG. 1 is a flowchart illustrating an image processing method according to one embodiment of the present invention.

Figure 5:
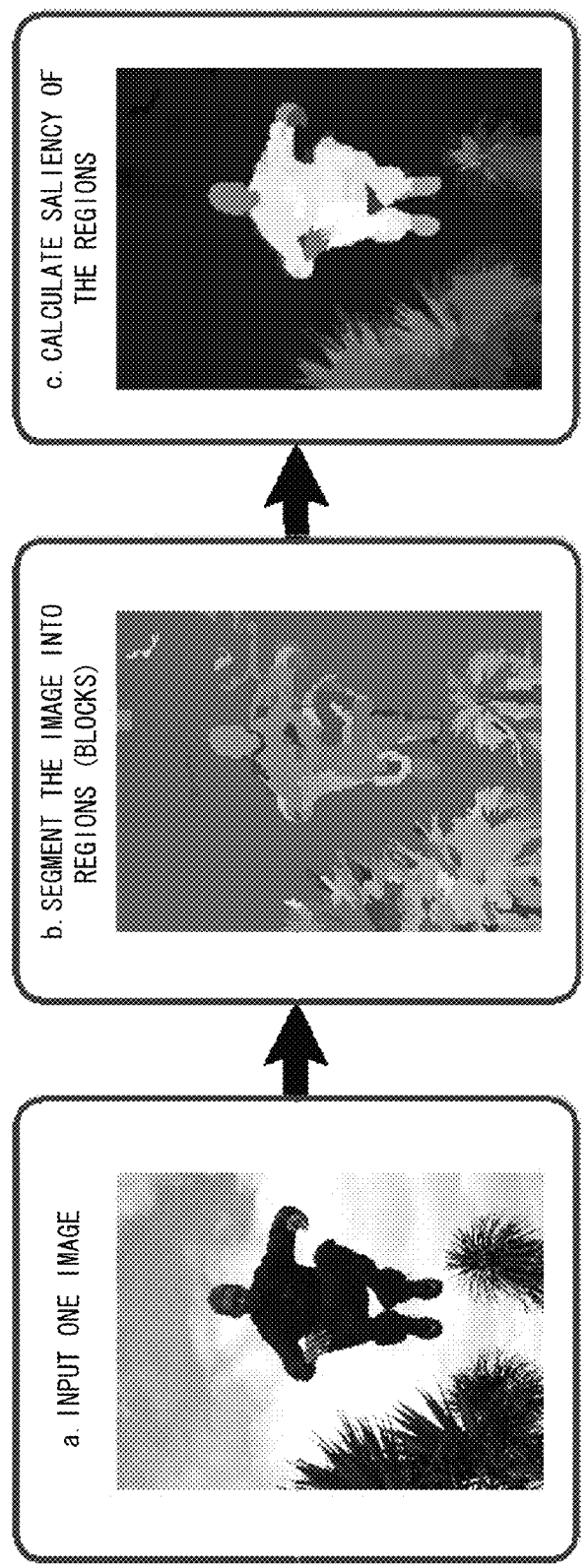
FIG. 5 is a diagram showing one example for processing an input image according to one or more embodiments of the present invention.

As shown in FIG. 1, in a segmentation step S1, with regard to any image inputted by the user or the like (for example, an input image shown in FIG. 5(a)), the input image is segmented into a plurality of regions (blocks) by any of automatic image segmentation algorithms. The input image may be inputted from outside the device in a wired or wireless manner, or may be a captured image inputted in real-time or afterwards by an imaging device. Alternatively, the input image may be read from an internal or external memory unit of the device. Used as the automatic segmentation algorithm for automatically segmenting input images is, for example, the method of "Efficient graph-based image segmentation" (IJCV, 59(2): 167-181), which was proposed in 2004 by Felzenszwalb and Huttenlocher. Alternatively, other existing automatic image segmentation algorithms could also be used.

In a computation step S2, with regard to the input image which has been segmented into a plurality of regions (blocks) by the automatic segmentation algorithm in the segmentation step S1 (for instance, as shown in FIG. 5(b)), a saliency value of each one of the segmented regions is calculated (detected) by computing a weighted sum of color differences between the one region and the other regions. If saliency values of all the regions have been calculated respectively, it is possible to obtain a saliency map as shown in FIG. 5(c).

According to the above-described image processing method, it is possible to rapidly and efficiently analyze saliency values of pixels in the image. In addition, it is possible to efficiently analyze complex and varied natural images and also to satisfy the needs for many real-time processing applications.

Additionally, in the image processing method, a saliency $S(r_k)$ of a region $r_k$ of the plurality of segmented regions (1, 2, ... k ... m) is defined by the following expression:

$$S(r_k) = \sum_{r_k \neq r_i} \exp\left(-\frac{D_s(r_k, r_i)}{\sigma_s^2}\right) w(r_i) D_c(r_k, r_i)$$

wherein $D_s(r_k,r_i)$ and $D_c(r_k,r_i)$ are respectively a spatial distance and a color difference between the region $r_k$ and a region $r_i$, i, k, and m are natural numbers, $w(r_i)$ is a weighted value of the region $r_i$, and $\sigma_s^2$ is a parameter for controlling the effect of a distance factor.

Further, in the image processing method, the larger the value of the parameter $\sigma_s^2$ is, the smaller the effect of the distance factor will be. On the contrary, the smaller the value of the parameter $\sigma_s^2$ is, the larger the effect of the distance factor will be. When spatial coordinates of a pixel in the image are normalized (linearly-resized) to values in a range from 0 to 1, the parameter $\sigma_s^2$ for controlling the effect of the distance factor can be a value in a range from 0.01 to 10, or a value in a range from 0.1 to 1.0. When $\sigma_s^2=0.4$, it is possible to obtain a great effect of image saliency detection (computation).

Further, in the image processing method, the number of pixels included in the region $r_i$ may be deemed as the weighted value $w(r_i)$ of the region $r_i$.

Additionally, in the image processing method, the color difference $D_c(r_k,r_i)$ between the region $r_k$ and the region $r_i$ is defined by the following expression:

$$D_c(r_k,r_i)=\sum_{i=1}^{n_1}\sum_{j=1}^{n_2}f(c_{1,i})f(c_{2,j})D(c_{1,i},c_{2,j})$$

wherein $f(c_k,i)$ is an appearance frequency of the i-th $c_k$ of $n_k$ types of colors contained in the region $r_k$, $D(c_{1,i},c_{2,j})$ is an Euclidean distance between two colors $c_{1,i}$ and $c_{2,j}$ in a color space, and $k=\{1,2\}$.

Further, in the image processing method, the computation is performed with 2 to 256 classes of colors in each color channel. The lower the adopted color class (level) is, the smaller the computation amount will be, and the poorer the accuracy will be. On the contrary, the higher the adopted color class is, the larger the computation amount will be, and the better the accuracy will be. For the speeding-up of the computation, each color channel does not necessarily adopt full-colors of 256 classes. For example, according to one or more embodiments of the present invention, the computation is performed with 8 to 128 classes of colors in each color channel. In the saliency detection method according to one or more embodiments of the present invention, a simulation with 12 classes of colors in each color channel allows for a great effect. Therefore, it is possible to significantly reduce the computation amount while ensuring the accuracy of detected image saliency.

Figure 2:
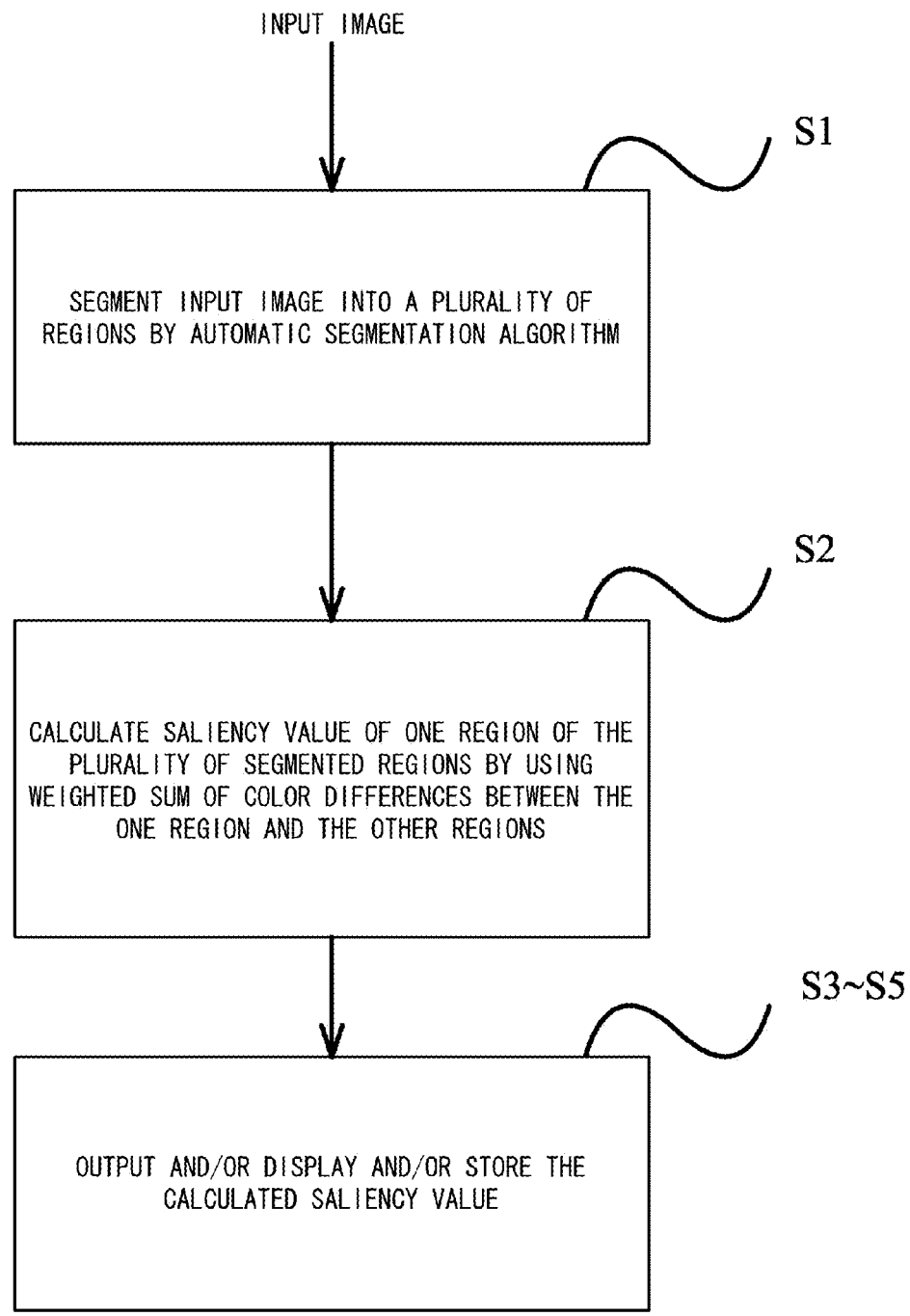
FIG. 2 is a flowchart illustrating an image processing method according to another embodiment of the present invention.

FIG. 2 is a flowchart illustrating an image processing method according to another embodiment of the present invention.

As shown in FIG. 2, the image processing method may include, in addition to the segmentation step S1 and the computation step S2, at least one step of the following steps S3~S5. An output step S3 outputs the calculated saliency value; a display step S4 displays the calculated saliency value, and a storage step S5 stores the calculated saliency value. That is, with a suitable combination of the output step S3, the display step S4, and the storage step S5, it is possible to apply the obtained saliency detection result to a desired scene. The order of the output step, the display step and the storage step is not limited.

Figure 3:
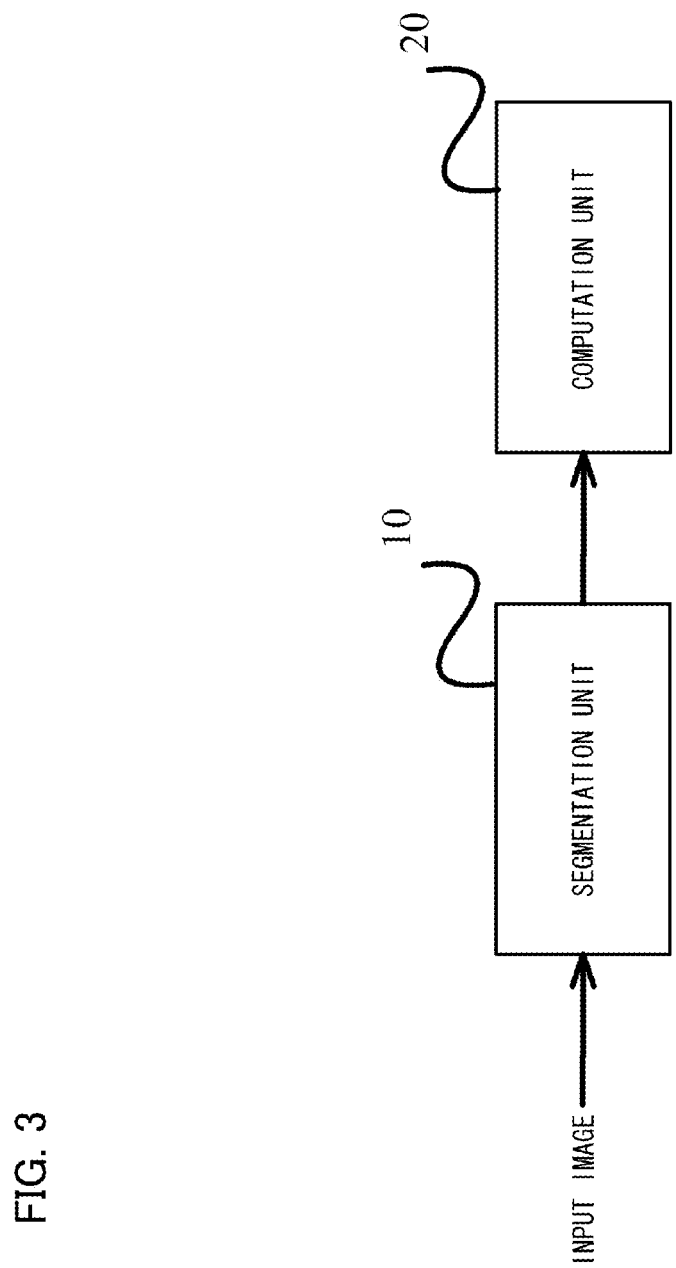
FIG. 3 is a block diagram illustrating an image processing device according to one embodiment of the present invention.

FIG. 3 is a block diagram illustrating an image processing device according to one embodiment of the present invention.

As shown in FIG. 3, an image processing device 1 according to the present embodiment detects visual saliency of an image based on regional contrast. The image processing device 1 includes: a segmentation unit 10 that segments an input image into a plurality of regions by using an automatic segmentation algorithm; and a computation unit 20 that calculates a saliency value of one region of the plurality of segmented regions by using a weighted sum of color differences between the one region and the other regions.

With regard to any image inputted by the user or the like (for example, an input image shown in FIG. 5(a)), the segmentation unit 10 segments the input image into a plurality of regions (blocks) by any of automatic image segmentation algorithms. The input image may be inputted from outside the device in a wired or wireless manner, or may be a captured image inputted in real-time or afterwards by an imaging device. Alternatively, the input image may be read from an internal or external memory unit of the device. Used as the automatic segmentation algorithm for automatically segmenting input images is, for example, the method of "Efficient graph-based image segmentation" (IJCV, 59(2): 167-181), which was proposed in 2004 by Felzenszwalb and Huttenlocher. Alternatively, other existing automatic image segmentation algorithms could also be used.

With regard to the input image which has been segmented into a plurality of regions (blocks) by the automatic segmentation algorithm in the segmentation unit 10 (for instance, as shown in FIG. 5(b)), a saliency value of each one of the segmented regions is calculated (detected) by computing a weighted sum of color differences between the one region and the other regions. If saliency values of all the regions have been calculated respectively, it is possible to obtain a saliency map as shown in FIG. 5(c).

According to the above-described image processing device, it is possible to rapidly and efficiently analyze saliency values of pixels in the image. According to one or more embodiments of the present invention, it is possible to efficiently analyze complex and varied natural images and also to satisfy the needs for many real-time processing applications.

In the image processing device 1, a saliency $S(r_k)$ of a region $r_k$ of the plurality of segmented regions (1, 2, ... k ... m) is defined by the following expression:

$$S(r_k) = \sum_{r_k \neq r_i} \exp\left(-\frac{D_s(r_k, r_i)}{\sigma_s^2}\right) w(r_i) D_c(r_k, r_i)$$

wherein $D_s(r_k,r_i)$ and $D_c(r_k,r_i)$ are respectively a spatial distance and a color difference between the region $r_k$ and a region $r_i$, i, k, and m are natural numbers, $w(r_i)$ is a weighted value of the region $r_i$, and $\sigma_s^2$ is a parameter for controlling the effect of a distance factor.

Further, in the image processing device 1, the larger the value of the parameter $\sigma_s^2$ is, the smaller the effect of the distance factor will be. On the contrary, the smaller the value of parameter $\sigma_s^2$ is, the larger the effect of the distance factor will be. When spatial coordinates of a pixel in the image are normalized (linearly-resized) to values in a range from 0 to 1, the parameter $\sigma_s^2$ for controlling the effect of the distance factor can be a value in a range from 0.01 to 10, or a value in a range from 0.1 to 1.0. When $\sigma_s^2=0.4$, it is possible to obtain a great effect of image saliency detection (computation).

Further, in the image processing device 1, the number of pixels included in the region $r_i$ may be deemed as the weighted value $w(r_i)$ of the region $r_i$.

Additionally, in the image processing device 1, the color difference $D_c(r_k,r_i)$ between the region $r_k$ and the region $r_i$ is defined by the following expression:

$$D_c(r_k,r_i)=\Sigma_{i=1}^{n1}\Sigma_{j=1}^{n2}f(c_{1,i})f(c_{2,j})D(c_{1,i},c_{2,j})$$

wherein is $f(c_k,i)$ an appearance frequency of the i-th $c_k$ of $n_k$ types of colors contained in the region $r_k$, $D(c_{1,i},c_{2,j})$ is an Euclidean distance between two colors $c_{1,i}$ and $c_{2,j}$ in a color space, and k={1, 2}.

Further, in the image processing device 1, the computation is performed with 2 to 256 classes of colors in each color channel. The lower the adopted color class (level) is, the smaller the computation amount will be, and the poorer the accuracy will be. On the contrary, the higher the adopted color class is, the larger the computation amount will be, and the better the accuracy will be. For the speeding-up of the computation, each color channel does not necessarily adopt full-colors of 256 classes. For example, according to one or more embodiments of the present invention, the simulation is performed with 8 to 128 classes of colors in each color channel.

In the saliency detection method according to one or more embodiments of the present invention, a simulation with 12 classes of colors in each color channel allows for a great effect. Therefore, it is possible to significantly reduce the computation amount while ensuring the accuracy of detected image saliency. In addition, it is possible to efficiently analyze complex and varied natural images and also to satisfy the needs for many real-time processing applications.

Figure 4:
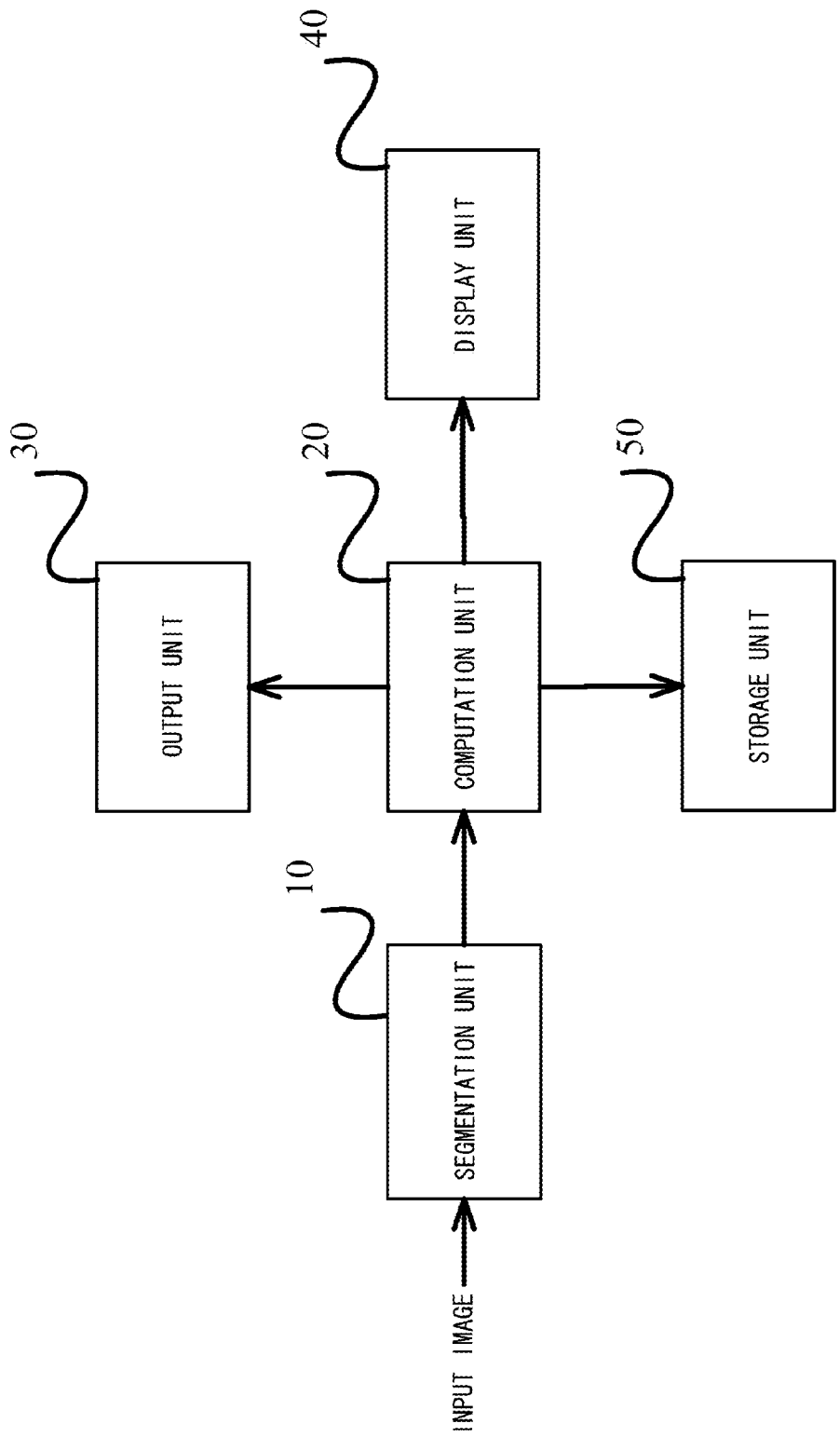
FIG. 4 is a block diagram illustrating an image processing device according to another embodiment of the present invention.

FIG. 4 is a block diagram illustrating an image processing device according to another embodiment of the present invention.

As shown in FIG. 4, the image processing device 1 may include, in addition to the segmentation unit 10 and the computation unit 20, at least one unit of the following units 30, 40, and 50. An output unit 30 outputs the calculated saliency value, a display unit 40 displays the calculated saliency value, and a storage unit 50 stores the calculated saliency value. That is, with a suitable combination of the output unit 30, the display unit 40, and the storage unit 50, it is possible to apply the obtained saliency detection result to a desired scene. According to embodiments of the present invention, it is possible to significantly reduce the computation amount while ensuring the accuracy of detected image saliency. In addition, it is possible to efficiently analyze complex and varied natural images and also to satisfy the needs for many real-time processing applications.

The above detailed description has been made using specific values for understanding the present invention; however, these values are merely examples and any other appropriate values can be used unless otherwise specified. With regard to the present invention, the differentiation between embodiments and items is not substantive, but the items recorded in two or more embodiments or items can be combined if necessary. For ease of explanation, the functional block diagrams are used to describe the device according to the embodiments of the present invention, and the device can be implemented by hardware, software, or a combination thereof. The present invention is not limited to the above-mentioned embodiments. Various changes, modifications, alternatives, and replacements still fall into the scope of the present invention without departing from the spirit of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing method for detecting visual saliency of an image based on regional contrast, the method comprising:

segmenting an input image into a plurality of regions by using an automatic segmentation algorithm; and calculating a saliency value of one region of the plurality of segmented regions by using a weighted sum of color differences between the one region and all other regions and by using spatial distances between the one region and all other regions, wherein, in the segmenting, a saliency $S(r_k)$ of a region $r_k$ of the plurality of segmented regions is defined by the following expression:

$$S(r_k) = \sum_{r_k \neq r_i} \exp\left(-\frac{D_s(r_k, r_i)}{\sigma_s^2}\right) w(r_i) D_c(r_k, r_i), \text{ and}$$

wherein $D_s(r_k,r_i)$ and $D_c(r_k,r_i)$ are respectively a sMatial distance and a color difference between the region $r_k$ and a region $r_i$, and k are natural numbers, $w(r_i)$ is a weighted value of the region $r_i$ and $\sigma_s^2$ is a parameter for controlling the effect of a distance factor.

2. The image processing method according to claim 1, wherein the parameter $\sigma_s^2$ is a value in a range from 0.1 to 1.0 when spatial coordinates of a pixel in the image are normalized to values in a range from 0 to 1.

3. The image processing method according to claim 1, wherein a number of pixels included in the region r, is deemed as the weighted value $w(r_i)$ of the region $r_i$.

4. The image processing method according to claim 1, wherein the color difference $D_c(r_k,r_i)$ between the region $r_k$ and the region $r_i$ is defined by the following expression: $D_c(r_k,r_i)=\Sigma_{i=1}^{n_1}\Sigma_{j=1}^{n_2} f(c_1,i)f(c_2,j)D(c_{1,i},c_{2,j})$, and wherein $f(c_k,i)$ is an appearance frequency of i-th $c_k$ of $n_k$ types of colors contained in the region $r_k$, $D(c_{1,i},c_{2,j})$ is an Euclidean distance between two colors $c_{1,i}$ and $c_{2,j}$ in a color space, and k={1,2}.

5. The image processing method according to claim 4, wherein the calculating is performed with 8 to 128 classes of colors in each color channel.

6. An image processing device for detecting visual saliency of an image based on regional contrast, the device comprising:
 a segmentation processor that segments an input image into a plurality of regions by using an automatic segmentation algorithm; and
 a computation processor that calculates a saliency value of one region of the plurality of segmented regions by using a weighted sum of color differences between the one region and all other regions and by spatial distances between the one region and all other regions,
 wherein a saliency $S(r_k)$ of a region $r_k$ of the plurality of segmented regions is defined by the following expression:

$$S(r_k) = \sum_{r_k \neq r_i} \exp\left(-\frac{D_s(r_k, r_i)}{\sigma_s^2}\right) w(r_i) D_c(r_k, r_i), \text{ and}$$

wherein $D_s(r_k,r_i)$ and $D_c(r_k,r_i)$ are respectively a spatial distance and a color difference between the region $r_k$ and a region $r_i$, i, and k are natural numbers, $w(r_i)$ is a weighted value of the region $r_i$ and $\sigma_s^2$ is a parameter for controlling the effect of a distance factor.

7. The image processing device according to claim 6, wherein the parameter $\sigma_s^2$ is a value in a range from 0.1 to 1.0 when spatial coordinates of a pixel in the image are normalized to values in a range from 0 to 1.

8. The image processing device according to claim 6, wherein a number of pixels included in the region r, is deemed as the weighted value $w(r_i)$ of the region $r_i$.

9. The image processing device according to claim 6, wherein the color difference $D_c(r_k,r_i)$ between the region $r_k$ and the region $r_i$ is defined by the following expression: $D_c(r_k,r_i)=\Sigma_{i=1}^{n_1}\Sigma_{j=1}^{n_2} f(c_1,i)f(c_2,j)D(c_{1,i},c_{2,j})$, and wherein $f(c_k,i)$ is an appearance frequency of i-th $c_k$ of $n_k$ types of colors contained in region $r_k$, $D(c_{1,i},c_{2,j})$ is an Euclidean distance between two colors $c_{1,i}$ and $c_{2,j}$ in a color space, and k={1,2}.

10. The image processing device according to claim 9, wherein the computation processor calculates with 8 to 128 classes of colors in each color channel.

11. The image processing method according to claim 1, further comprising at least one of:
 outputting the calculated saliency value;
 displaying the calculated saliency value; and
 storing the calculated saliency value.

12. The image processing method according to claim 2, further comprising at least one of:
 outputting the calculated saliency value;
 displaying the calculated saliency value; and
 storing the calculated saliency value.

13. The image processing method according to claim 3, further comprising at least one of:
 outputting the calculated saliency value;
 displaying the calculated saliency value; and
 storing the calculated saliency value.

14. The image processing method according to claim 4, further comprising at least one of:
 outputting the calculated saliency value;
 displaying the calculated saliency value; and
 storing the calculated saliency value.

15. The image processing method according to claim 5, further comprising at least one of:
 outputting the calculated saliency value;
 displaying the calculated saliency value; and
 storing the calculated saliency value.

16. The image processing device according to claim 6, further comprising at least one of:
 an output processor that outputs the calculated saliency value;
 a display processor that displays the calculated saliency value; and
 a storage processor that stores the calculated saliency value.

* * * * *